(12) United States Patent
Mastenbrook et al.

(10) Patent No.: US 11,831,752 B2
(45) Date of Patent: *Nov. 28, 2023

(54) INITIALIZING A DATA STORAGE DEVICE WITH A MANAGER DEVICE

(71) Applicant: Western Digital Technologies, Inc., San Jose, CA (US)

(72) Inventors: Brian Edward Mastenbrook, Fremont, CA (US); David Robert Arnold, Toronto (CA)

(73) Assignee: Western Digital Technologies, Inc., San Jose, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/739,065

(22) Filed: Jan. 9, 2020

(65) Prior Publication Data
US 2021/0218557 A1    Jul. 15, 2021

(51) Int. Cl.
*H04L 9/08* (2006.01)
*H04L 9/32* (2006.01)

(52) U.S. Cl.
CPC .......... *H04L 9/0825* (2013.01); *H04L 9/0822* (2013.01); *H04L 9/0861* (2013.01); *H04L 9/3247* (2013.01); *H04L 9/3263* (2013.01); *H04L 9/3271* (2013.01)

(58) Field of Classification Search
CPC ... H04L 9/0825; H04L 9/0866; H04L 9/0894; H04L 9/3271
See application file for complete search history.

(56) References Cited

U.S. PATENT DOCUMENTS

| | | |
|---|---|---|
| 5,978,475 A | 11/1999 | Schneier et al. |
| 6,131,090 A | 10/2000 | Basso, Jr. et al. |
| 7,076,062 B1 | 7/2006 | Spies |
| 7,805,611 B1 | 9/2010 | Montemayor et al. |

(Continued)

FOREIGN PATENT DOCUMENTS

| | | |
|---|---|---|
| EP | 2877955 | 5/2019 |
| WO | 2019/061001 | 4/2019 |

OTHER PUBLICATIONS

International Search Report and Written Opinion for International Application No. PCT/US2020/039212, dated Oct. 12, 2020, 9 pgs.

(Continued)

*Primary Examiner* — Moeen Khan
(74) *Attorney, Agent, or Firm* — Patent Law Works LLP

(57) ABSTRACT

Disclosed herein is a data storage device. A data port transmits data between a host computer system and the data storage device. A non-volatile storage medium stores encrypted user content data and a cryptography engine uses a cryptographic key to decrypt the encrypted user content data stored on the storage medium in response to a request from the host computer system. An access controller receives a request from a manager device to initialize the data storage device. The controller generates the cryptographic key, generates a manager key configured to provide manager access for the manager device and provide access to the cryptographic key, and stores, on a data store, authorization data indicative of the manager key and accessible based on a private key stored on the manager device.

20 Claims, 4 Drawing Sheets

(56) References Cited

U.S. PATENT DOCUMENTS

| | | |
|---|---|---|
| 8,010,790 B2 | 8/2011 | Lee et al. |
| 9,286,493 B2 | 3/2016 | Johnson et al. |
| 9,455,963 B1 | 9/2016 | Roth et al. |
| 9,690,916 B2 | 6/2017 | Lin |
| 9,813,416 B2 | 11/2017 | Bolotin et al. |
| 9,881,301 B2 | 1/2018 | Rajkumar et al. |
| 9,921,978 B1 | 3/2018 | Chan |
| 10,083,130 B2 | 9/2018 | Bolotin et al. |
| 10,146,706 B2 | 12/2018 | Bolotin et al. |
| 10,154,020 B1 | 12/2018 | Bolotin et al. |
| 10,181,055 B2 | 1/2019 | Bolotin et al. |
| 10,204,240 B2 | 2/2019 | Johnson et al. |
| 10,313,874 B2 | 6/2019 | Amundsen et al. |
| 10,355,858 B2 | 7/2019 | Collier et al. |
| 10,965,474 B1* | 3/2021 | Benson .............. H04W 12/33 |
| 2002/0023213 A1 | 2/2002 | Walker et al. |
| 2002/0073309 A1 | 6/2002 | Kurn et al. |
| 2003/0208662 A1 | 11/2003 | Heisch |
| 2004/0054901 A1 | 3/2004 | England et al. |
| 2004/0101141 A1 | 5/2004 | Alve |
| 2004/0172538 A1 | 9/2004 | Satoh et al. |
| 2004/0190722 A1 | 9/2004 | Grobman |
| 2005/0091491 A1 | 4/2005 | Lee et al. |
| 2005/0114686 A1 | 5/2005 | Ball et al. |
| 2005/0210247 A1 | 9/2005 | Ong et al. |
| 2007/0300052 A1 | 12/2007 | Jevans |
| 2008/0065882 A1 | 3/2008 | Goodman et al. |
| 2008/0219449 A1 | 9/2008 | Ball et al. |
| 2009/0034733 A1 | 2/2009 | Raman et al. |
| 2009/0110191 A1 | 4/2009 | Sanvido et al. |
| 2009/0138727 A1 | 5/2009 | Campello de Souza |
| 2009/0296926 A1 | 12/2009 | Perlman |
| 2010/0088527 A1 | 4/2010 | Johnson et al. |
| 2010/0122327 A1 | 5/2010 | Linecker et al. |
| 2010/0174913 A1 | 7/2010 | Johnson et al. |
| 2012/0144138 A1 | 6/2012 | Kandasamy et al. |
| 2012/0210130 A1 | 8/2012 | Buer et al. |
| 2013/0173484 A1 | 7/2013 | Wesby |
| 2014/0003608 A1 | 1/2014 | MacMillan et al. |
| 2014/0258730 A1 | 9/2014 | Stecher |
| 2015/0278125 A1 | 10/2015 | Bolotin et al. |
| 2015/0310431 A1 | 10/2015 | Lakshmanan et al. |
| 2016/0085959 A1 | 3/2016 | Trika et al. |
| 2016/0140334 A1 | 5/2016 | Forehand et al. |
| 2016/0149711 A1 | 5/2016 | Fitzgerald |
| 2016/0234022 A1 | 8/2016 | Motika et al. |
| 2016/0269367 A1 | 9/2016 | Cocotis et al. |
| 2017/0032148 A1 | 2/2017 | Sofia et al. |
| 2017/0075824 A1 | 3/2017 | Haen et al. |
| 2017/0091463 A1 | 3/2017 | Lindteigen et al. |
| 2017/0213045 A1 | 7/2017 | Garcia et al. |
| 2017/0288867 A1 | 10/2017 | Collier et al. |
| 2017/0293766 A1 | 10/2017 | Schnajkin et al. |
| 2017/0357822 A1 | 12/2017 | Wei et al. |
| 2018/0062863 A1* | 3/2018 | Baskaran .............. H04L 63/067 |
| 2018/0167208 A1 | 6/2018 | Le Saint et al. |
| 2018/0183777 A1 | 6/2018 | Guillory et al. |
| 2018/0307869 A1 | 10/2018 | Bolotin et al. |
| 2018/0323970 A1* | 11/2018 | Maron .............. H04L 9/0891 |
| 2018/0357406 A1 | 12/2018 | Bolotin et al. |
| 2019/0007203 A1* | 1/2019 | Bolotin .............. H04L 9/0894 |
| 2019/0036917 A1 | 1/2019 | Sun |
| 2019/0245688 A1 | 8/2019 | Patin |
| 2019/0266347 A1* | 8/2019 | Indukuri .............. G06F 21/35 |
| 2019/0303603 A1 | 10/2019 | Courtney et al. |
| 2019/0305949 A1* | 10/2019 | Hamel .............. H04L 9/3226 |
| 2020/0007332 A1 | 1/2020 | Girkar et al. |
| 2020/0026835 A1* | 1/2020 | Mitchell .............. G06F 3/04883 |
| 2020/0320622 A1 | 10/2020 | Meier et al. |
| 2020/0403786 A1 | 12/2020 | de Matos |
| 2021/0091950 A1 | 3/2021 | Asher et al. |
| 2021/0152372 A1* | 5/2021 | Hunt .............. H04L 63/0823 |

OTHER PUBLICATIONS

International Search Report and Written Opinion for International Application No. PCT/US2020/039214, dated Sep. 17, 2020, 7 pgs.

International Search Report and Written Opinion for International Application No. PCT/US2020/039215, dated Sep. 14, 2020, 10 pgs.

International Search Report and Written Opinion for International Application No. PCT/US2020/039216, dated Nov. 22, 2020, 8 pgs.

International Search Report and Written Opinion for International Application No. PCT/US2020/039217, dated Oct. 19, 2020, 11 pgs.

International Search Report and Written Opinion for International Application No. PCT/US2020/039714, dated Sep. 24, 2020, 9 pgs.

International Search Report and Written Opinion for International Application No. PCT/US2020/039715, dated Oct. 12, 2020, 10 pgs.

International Search Report and Written Opinion of Application No. PCT/US2020/039219, dated Oct. 1, 2020 (8 pages).

Athow, Desire, "SecureData SecureDrive BT 1TB review" Retrieved online, URL: <https://www.techradar.com/reviews/securedata-securedrive-bt-1tb>, accessed on Oct. 24, 2019.

Smith, Lyle, "SecureData SecureDrive BT External Drive Review" Retrieved online, URL: <https://storagereview.com/securedata_securedrive_bt_external_drive_review>, accessed on Oct. 24, 2019.

Van Allen, Fox, "How to Unlock Your Computer Automatically With Your Phone" Retrieved online, URL: <https://www.techlicious.com/tip/computer-proximity-locks-for-mac-pc-chromebook/>, accessed on Oct. 24, 2019.

"DataLock BT Remote Management", Retrieved online, URL: <https://www.clevx.com/datalock-bluetooth-encrypted-security/>, accessed on Oct. 24, 2019.

McCallum, Nathaniel, et al., latchset/ Tang, GitHub Post, Aug. 10, 2018, v7, p. 1-8, https://github.com/latchset/tang#recovery.

McCallum, Nathaniel, Network Bound Encryption for Data-at-Rest Protection, Red Hat, Inc. Presentation, https://www.snia.org/sites/default/files/SDC15_presentations/security/NathanielMcCallum_Network_Bound_Encryption.pdf.

Red Hat Enterprise Linux 8, Security hardening, Products & Services pamphlet, Chapter 9, Configuring automated unlocking of encrypted volumes using policy-based decryption, Red Hat Products & Services Webpage, 2020, p. 64-82, https://access.redhat.com/documentation/en-us/red_hat_enterprise_linux/8/html/security_hardening/configuring-automated-unlocking-of-encrypted-volumes-using-policy-based-decryption_security-hardening.

Scherf, Thorsten, Automatic data encryption and decryption with Clevis and Tang, Passing Secrets, Admin Network & Security, Online Magazine Article, 2018, p. 1-6, Issue 43, https://www.admin-magazine.com/Archive/2018/43/Automatic-data-encryption-and-decryption-with-Clevis-and-Tang.

Tweedale, Fraser, Introduction to Tang and Clevis, Fraser's IdM Blog, Feb. 11, 2016. p. 1-5, https://frasertweedale.github.io/blog-redhat/posts/2016-02-11-tang-tls.html.

* cited by examiner

INITIALIZING A DATA STORAGE DEVICE WITH A MANAGER DEVICE

TECHNICAL FIELD

This disclosure relates to initializing a data storage device.

BACKGROUND

Encryption of data enables relatively secure storage on data storage devices, such as block data storage devices connectable via a Universal Serial Bus (USB) cable. However, the user experience is often disappointing because the setup of passwords, keys and the like is cumbersome and complicated for technically unskilled users. If encryption is used, the keys and passwords are too often stored insecurely. As a result, many users leave existing encryption technology effectively unused resulting in exposed confidential data.

Further, management of data storage devices is more efficient and more secure if multiple roles are defined, such as user roles with restricted access and manager roles with full access. However, common solutions used in operating systems, such as access control lists based on log-in credentials, are impractical for data storage devices that are moved between different host computer systems. It would be desirable to define multiple roles internally in the data storage device without use of an external operating system and access control lists. Further, it is difficult to grant access to the data storage device for the first time after a factory reset of the data storage device.

SUMMARY

This disclosure relates to a data storage device and a "take ownership" process during which a user device, such as a mobile phone, registers with the data storage device to gain manager access with full permission including permission to alter the configuration of the data storage device and permission to decrypt user content data. In some embodiments, the take ownership process comprises crypto-erasing the user content data. This means that the cryptographic keys used to encrypt the user content data are deleted or overwritten by new cryptographic keys.

Disclosed herein is a data storage device comprising a data path, an access controller, and a non-volatile data store. The data path comprises a data port configured to transmit data between a host computer system and the data storage device; a non-volatile storage medium configured to store encrypted user content data; and a cryptography engine connected between the data port and the storage medium and configured to use a cryptographic key to decrypt the encrypted user content data stored on the storage medium in response to a request from the host computer system. The access controller is configured to receive a request from a manager device to initialize the data storage device; generate the cryptographic key; generate a manager key configured to provide manager access for the manager device and provide access to the cryptographic key; and store, on the data store, authorization data indicative of the manager key and accessible based on a private key stored on the manager device.

In some embodiments, the access controller is further configured to derive a user key from the manager key; and encrypt the cryptographic key using the user key.

In some embodiments, the access controller is further configured to encrypt the manager key; and the authorization data comprises the encrypted manager key.

In some embodiments, the encrypted manager key is decryptable based on a unlocking private key stored on the manager device.

In some embodiments, the encrypted manager key is decryptable based on a response from the manager device to a challenge generated by the access controller; and the response was calculated by the manager device based on the unlocking private key stored on the manager device.

In some embodiments, the challenge is based on the authorization data.

In some embodiments, the access controller is further configured to: generate an ephemeral private key; calculate an ephemeral unlock secret based on the ephemeral private key; and encrypt the manager key using the ephemeral unlock secret.

In some embodiments, the ephemeral unlock secret is based on an unlocking public key corresponding to an unlocking private key stored on the manager device.

In some embodiments, the ephemeral unlock secret and the unlocking private key are based on elliptic curve cryptography.

In some embodiments, the access controller is further configured to calculate an ephemeral public key corresponding to the ephemeral private key; and encrypt the ephemeral public key using a metadata wrapping key.

In some embodiments, the access controller is further configured to generate the metadata wrapping key.

In some embodiments, the access controller is further configured to provide the metadata wrapping key to the manager device.

In some embodiments, the access controller is further configured to create a certificate for the manager device, wherein the certificate includes the metadata wrapping key; sign the certificate; and send the signed certificate to the manager device.

In some embodiments, the certificate comprises a transport public key sent to the access controller and corresponding to a transport private key stored on the manager device.

In some embodiments, receiving the request from the manager device to initialize the data storage device comprises establishing a secure communication channel.

In some embodiments, establishing the secure communication channel is based on an identity key provided on the data storage device and readable by the manager device out-of-band.

In some embodiments, establishing the secure communication channel comprises generating a certificate; signing the certificate; and sending the signed certificate to the manager device.

In some embodiments, the access controller is further configured to remove access for devices other than the manager device.

Further disclosed herein is a method for initializing a data storage device. The method comprises receiving a request from a manager device to initialize the data storage device; generating a cryptographic key configured to decrypt encrypted user content data stored on a storage medium of the data storage device; generating a manager key configured to provide manager access for the manager device and provide access to the cryptographic key; and storing, on a non-volatile data store of the data storage device, authorization data indicative of the manager key and accessible based on a private key stored on the manager device.

Further disclosed herein is a data storage device comprising means for receiving a request from a manager device to initialize the data storage device; means for generating a cryptographic key configured to decrypt encrypted user content data stored on a storage medium of the data storage device; means for generating a manager key configured to provide manager access for the manager device and provide access to the cryptographic key; and means for storing, on a non-volatile data store of the data storage device, authorization data indicative of the manager key and accessible based on a private key stored on the manager device.

BRIEF DESCRIPTION OF DRAWINGS

A non-limiting example will now be described with reference to the following drawings.

DESCRIPTION OF EMBODIMENTS

Figure 1:
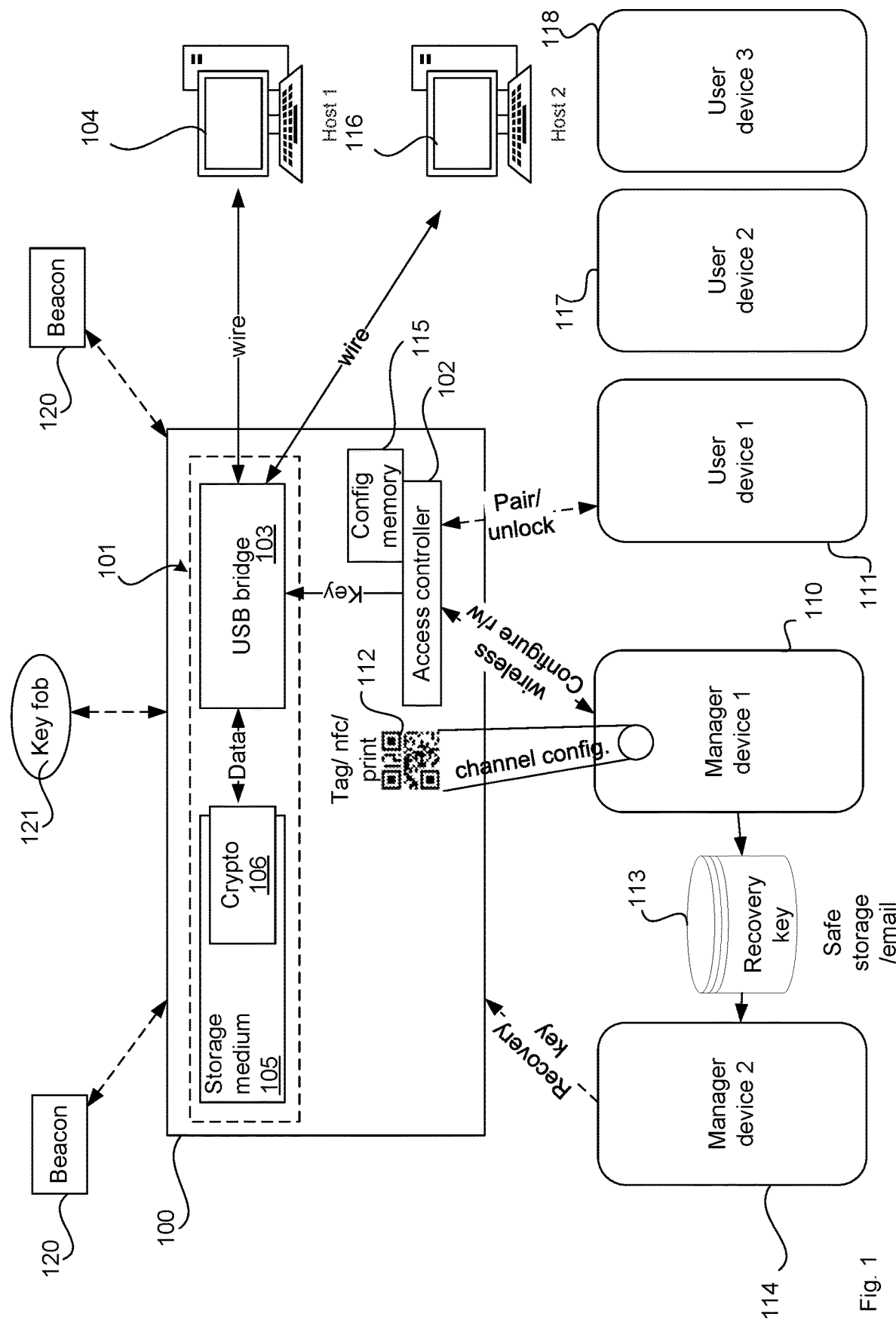
FIG. 1 illustrates a data storage device, according to an embodiment.

FIG. 1 illustrates a data storage device (DSD) 100 comprising a data path 101 and an access controller 102, according to an embodiment. The data path 101 comprises a wire-based data port 103, which is provided in FIG. 1 by a USB bridge, for transmission of data between a host computer system 104 and the DSD 100. In other embodiments, the data path 101 comprises a wireless data port (not shown) for wireless transmission of data between the host computer system 104 and the DSD 100. The DSD 100 registers with the host computer system 104 as a mass data storage device providing the functionality to the operating system of the host computer system 104 of a block data storage device. DSD 100 further comprises a non-transitory storage medium 105 to store encrypted user content data, noting that the user content data is the data that a user would typically want to store on a DSD, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 105 and read in blocks from the storage medium 105.

Command Set

In one example, storage medium 105 comprises a cryptography engine 106 in the form of a dedicated and/or programmable integrated circuit that encrypts data to be stored on storage medium 105 and decrypts data to be read from storage medium 105. In such examples, the storage medium may provide a Small Computer System Interface (SCSI) or Advanced Technology Attachment (ATA) command set according to the Opal specification by the Trusted Computing Group (TCG).

Program code stored on the cryptography engine 106 enables the cryptography engine 106 to receive, interpret and execute commands received from host computer system 104. For example, cryptography engine 106 may be configured to implement the standard ATA or serial ATA (SATA) and/or ATA Packet Interface (ATAPI) command set, which is available from Technical Committee T13 noting that identical functionalities can be implemented within TCG Opal, SCSI and other proprietary architectures. The command set comprises a READ SECTORS command with a command input of the count of sectors and the starting sector (noting that "sector" is used synonymously with "block" herein). Accordingly, there is a corresponding write command. It is noted that there is a data storage device driver installed on host computer system 104. The data storage device driver (not shown) uses the command set to provide high-level services to the operating system, such as file read functionalities. In some examples, the data storage device driver is a generic driver supplied as part of the operating system without support for device-specific encryption commands since the encryption functionality is hidden from the host computer system 104 and handled internally within DSD 100 as described below. This means that no additional drivers need to be installed to use the full functionality disclosed herein.

The command set provided by the cryptography engine 106 to the data port 103 (but not forwarded to host computer system 104) may include a command set from the ATA SECURITY feature set. In particular, the command set may include the command SECURITY SET PASSWORD or a corresponding command from TCG Opal to set a password for reading and writing user content data to the storage medium 105.

In this sense, cryptography engine 106 is connected between the data port 103 and the storage medium 105 and is configured to use a cryptographic key to encrypt user content data to be stored on the storage medium 105 and to decrypt the encrypted user content data stored on the storage medium 105 in response to a request from the host computer system 104. In some examples, the ATA SECURITY feature set is used only by data port 103 and not by host 104. That is, the access controller 102 provides the necessary input for the data port 103 to issue the ATA SECURITY commands to the cryptography engine 106. For example, the access controller 102 may provide a key to the data port 103, which the data port 103 then forwards to the cryptography engine 106 via the SECURITY SET PASSWORD command. The interface between the access controller 102 and the data port 103 may be an Inter-Integrated Circuit (I2C) bus, which is particularly useful in cases where this bus is already implemented in existing chips. However, it is possible to use many other communication architectures including bus, point-to-point, serial, parallel, memory based and other architectures.

Note that the separation of functionalities in dedicated chips as shown in FIG. 1 is only one possible example implementation. Therefore, it is possible to combine functionalities or split the functionalities further. For example, data port 103 may be integrated with access controller 102 into a single chip with a single core. In other cases, the data port 103 and the access controller 102 can be integrated with cryptography engine 106 into a single dedicated chip with a single core. Of course, all chips may have multiple cores.

In one example, the following components are used:
Data port 103: USB 3.1 Gen 2 10 gigabits per second (Gb/s) interface
Access controller 102: nRF52840 system-on-chip (SoC) from Nordic Semiconductor It is noted that for the functionality disclosed herein, the access controller 102 plays the leading role and will be described in more detail below, noting again that the tasks may be separated into separate chips in other examples. When reference is made to a 'configuration' of the access controller 102 or the access controller 102 being 'configured' to perform a certain step, this is to be understood to relate to program code that is stored on non-volatile memory in the DSD 100 on program memory (not shown for clarity) and executed by the access controller 102.

In other examples, some or all steps disclosed herein may be performed by hardware circuitry without program code. In particular, encryption primitives may be implemented by dedicated hardware circuitry for performance and security reasons. For example, commands that are particularly computationally demanding, such as elliptic curve multiplication or exponentiation, may be implemented by an Arithmetic Logic Unit (ALU) specifically designed for this calculation, such that the calculation can be performed in a single or a smaller number of processor cycles compared to using a sequential program in a general purpose microcontroller. It is further noted that the chips included in DSD 100 are microcontrollers, which means in this context that they do not run under an operating system that provides a hardware abstraction layer but the program code acts directly on the hardware circuit. While elliptic curve cryptography is used herein as examples for reasons of computational efficiency and security, it is noted that other public-key cryptosystems, such as the Rivest-Shamir-Adelman (RSA) cryptosystem, could equally be used.

Returning back to FIG. 1, there are a number of devices in addition to host computer system 104 that are external to the DSD 100 and that act in the process of unlocking the DSD 100 and providing a key to the cryptography engine 106 so that, ultimately, decrypted data in plain text can be provided to host computer system 104.

In particular, there is a first manager device 110, which is a mobile phone in most examples. Installed on the manager device 110 is an application (app') to perform the following steps. In this way, the following steps can be implemented in software by the manufacturer of the DSD 100 and distributed to the manager device 110 through a commonly accessible app store, such as Apple's App Store or Google Play. The app installed on manager device 110 performs steps to take ownership of the DSD 100 at which point all data on the DSD 100 is erased or otherwise made inaccessible. For example, data may be crypto-erased by securely deleting all cryptographic keys stored on DSD 100.

For simplicity of presentation, this disclosure describes steps as simply being performed by manager device 110 if they are implemented by the app. The manager device 110 sets up the DSD 100, which means the various different keys are generated to support the process disclosed herein. Manager device 110 registers a user device 111 with the DSD, so that the user device 111 is then referred to as the "authorized device" 111. In most examples, the authorized device 111 is also a mobile phone with an app installed that implements the steps described as being performed by the authorized device 111. However, other types of devices can be used as authorized devices, which will be explained below in relation to beacons and key fobs.

Taking Ownership

The first step in using DSD 100 after purchase, unpacking and power-up is to install the app on manager device 110 and register a device as the manager device 110. For this process, the manager device 110 obtains a unique identifier of the DSD from the DSD. This unique identifier is referred to as the identity key (IDK). In the example illustrated in FIG. 1, the identity key is encoded in a quick response (QR) code 112 which is affixed to an external surface of the DSD 100. The app installed on manager device 110 has access to a camera and has a software module that extracts the encoded information from an image of the QR code 112. The manager device 110 captures an image of the QR code 112 using the camera, and decodes the identity key of DSD 100 from the QR code. In one example, the QR code encodes a Uniform Resource Locator (URL). In that case, a generic app can capture the QR code, which then automatically directs the phone to an application store where the app can be downloaded. The URL also includes the identity key so that the app can decode that identifier once the app is installed.

In another example, manager device 110 may read another tag or NFC chip affixed or integrated with DSD 100 to obtain the identity key. Using that identity key, the manager device 110 can then initiate a communication, such as wirelessly (e.g., over Bluetooth), with the DSD 100 and in particular, with the access controller 102.

Recovery Key

Upon taking ownership of the DSD 100, the access controller 102 generates a recovery key and provides the recovery key to the manager device 110. The recovery key can then be stored on a secure storage 113 or printed and locked away. Ultimately, the recovery key can be used by a backup manager device 114 to assume the manager role that the manager device 110 previously had.

Registration of Authorized Device

Once the DSD 100 is initially configured during the take ownership process, manager device 110 registers the authorized device 111. Typically, there may be multiple authorized devices registered with a single DSD 100 so manager device 110 registers the authorized device as one of multiple authorized devices. More particularly, access controller 102 receives from the manager device 110 a public key associated with a private key stored on user device 111. The manager device 110 itself may have received the public key from the user device 111 via email, by scanning a QR code displayed on the user device 111 or any other way. At this point in time, device 111 is not yet authorized and therefore, simply referred to as "user device 111". Once user device 111 is authorized, it is referred to as "authorized device 111". Access controller 102 creates authorization data that indicates that user device 111 is an authorized device (as described below) and stores the authorization data associated with the public key on the configuration memory 115 to register the user device 111 as one of the multiple authorized devices. This means keys and other data associated with authorized device 111 are created and stored as described below. A user can then use the authorized device 111 to unlock the DSD 100 simply by bringing the authorized device 111 into wireless communication range, such as within Bluetooth range. Again, the steps performed by authorized device 111 are encoded in an app installed on authorized device 111. Depending on configuration parameters, the user may be required to unlock authorized device 111 before DSD 100 can be unlocked.

More particularly, access controller 102 has access to a non-volatile configuration data store, such as configuration memory 115, which may be a flash memory that is external to the access controller 102 (but may equally be integrated into access controller 102). Configuration memory 115 may also store the program code that implements the steps described herein as being executed by access controller 102. It is noted that some examples herein are configured under the assumption that an attacker can readily unsolder and read out the content of the configuration memory 115 but should not be able to decrypt the user content data with that information. That is, in those examples, no keys are stored persistently in plain text on configuration memory 115 or elsewhere in DSD 100 on non-volatile memory.

Once the cryptographic keys are available in plain text, they are stored only in volatile memory (not shown). This means that a power-down of the DSD 100 erases all cryptographic keys stored in plain text. Additional circuitry may be provided to reset all remaining charges on power-down, power-up or external reset, so that it is physically impossible in practice to recover any information from volatile memory. In many cases, power-down and erasure of all volatile memory occurs as a result of the user disconnecting the USB cable from the host computer system 104. In other examples, a secondary power supply is used which needs to be disconnected to power down the DSD 100 to delete the volatile memory.

Challenge-Response

Configuration memory 115 has stored thereon data that is specific for the registered authorized device 111. This data may be referred to as an identifier of the authorized device 111 or as a public key associated with a corresponding private key stored on the authorized device 111. The public key may be a "transport public key" (TPK) and is generated by the authorized device 111 on first launch of the app by executing an elliptic curve cryptography (ECC) primitive ECC-Pub({transport private key}). (Recall that while elliptic curve cryptography is used herein as examples for reasons of computational efficiency and security, it is noted that other cryptographic techniques could equally be used.) The corresponding private key is stored on authorized device 111. The access controller 102 is configured to use the identifier (e.g., transport public key) or generate and store a further public key, to generate a challenge for the authorized device 111. It is noted here that the challenge is unique in the sense that each challenge is different, so that a subsequent challenge is different from any previous challenges. As described below, this is achieved by multiplying the stored data by a random blinding factor. Then, the access controller 102 sends the challenge to the authorized device 111 over a communication channel that is different from the data path. For example, the data path may include a wire-based USB connection while the communication channel between the access controller 102 and the authorized device 111 is a wireless (e.g., Bluetooth) connection.

In one example, a re-enrolment process takes place responsive to the authorized device connecting with the DSD 100 for the first time after the authorization data was created and stored on configuration memory 115 associated with the public key of the authorized device 111 received from the manager device 110. During the re-enrolment process, DSD 100 updates the authorization data and as set out below may request authorized device 111 to generate an unlocking public key (and a corresponding unlocking private key) in addition to the transport public key. The authorized device 111 then provides the unlocking public key to the access controller 102.

This has the advantage that the two corresponding private keys (transport private key and unlocking private key) can be stored separately on the authorized device and both keys can have different access policies. For example, transport public key may be accessible at any time, even if the authorized device 111 is locked (e.g., by a screen lock or time out), so as to allow continuous communication between authorized device 111 and DSD 100. To unlock DSD 100, however, the access policy of the unlocking private key may require that the user unlocks authorized device 111, enters a personal identification number (PIN), provides biometric or other authentication. This way, DSD 100 cannot be unlocked by a stolen authorized device. Since unlocking DSD 100 is performed only once while DSD 100 is powered, the increased security does not significantly reduce user convenience.

The authorized device 111 can calculate a response to the challenge that cannot be calculated by any other device that is not registered with the DSD. More specifically, the correct response cannot be calculated by a device that does not have access to data that corresponds to the identifier stored on configuration memory 115. For example, authorized device 111 uses the stored unlocking private key that is associated with the corresponding unlocking public key stored on configuration memory 115, to calculate the response to the challenge.

The access controller 102 receives the response to the challenge from the authorized device 111 over the communication channel. It is noted here that if the access controller 102 simply validates the response to the challenge and upon success, reads the cryptographic key from configuration memory 115, the cryptographic key would be stored in plain text, which is undesirable since this would enable an attacker to disassemble the DSD 100 and read the key from configuration memory 115 to access the user content data stored on storage medium 105.

Calculate Key

So, instead, access controller 102 calculates the cryptographic key based at least partly on the response from the authorized device 111. This means the cryptographic key is not a pure function of the response but involves other values as described in more detail below. In summary, the cryptographic key is stored in encrypted form on configuration memory 115 and the response, which is based on the private key stored on the authorized device, enables the calculation of the secret that decrypts the cryptographic key.

Throughout this disclosure, reference may be made to 'wrapping' of keys, which simply means that the key is encrypted by another key (i.e., by the "secret"). In many cases of 'wrapping' the encryption is symmetric such that a single secret (key) exists that can decrypt the encrypted key (without a public key associated with the secret). In one example, symmetric encryption uses the Advanced Encryption Standard (AES) primitive.

Finally, access controller 102 provides the cryptographic key to the cryptography engine 106 (via data port 103 in this example) to decrypt the encrypted user content data stored on the storage medium 105 of the DSD 100. As mentioned above, once the access controller 102 has calculated the cryptographic key, the access controller 102 provides the cryptographic key to the data port 103 in plain text and the data port 103 issues the SECURITY SET PASSWORD command to the cryptography engine 106 including the cryptographic key.

It is noted that where reference is made to 'unlocking' the device, this can refer to the entire process described above including the challenge, the response to the challenge and sending of the cryptographic key to the cryptography engine 106 to allow plain text read commands issued by the host computer system. In other examples, the challenge and the response to the challenge are considered as being part of a separate 'connect' step. During the following 'unlocking' step the access controller 102 then sends the cryptographic key to the data port 103 to allow access to the user content data.

It is noted, as an aside, that it may be possible for an attacker to eavesdrop on the key transmission from the access controller 102 to the data port 103 and then to the cryptography engine 106. However, the transmission of the key is not over a public network, so this eavesdropping would require gaining access to and disassembling the unlocked DSD without removing power from the DSD 100. This scenario may be discarded as a threat since in this scenario the user content data is available anyway on host computer system 104. In other words, while the DSD 100 is connected and unlocked, data is available to the rightful user and the attacker. But once the user disconnects the DSD from host computer system 104, this eavesdrop attack is not possible anymore. Therefore, this attack is not further considered.

For completeness it is noted that once the cryptography engine 106 has received the cryptographic key, the host computer system 104 can issue ordinary READ SEGMENT commands and transparently access the encrypted data without any perceivable difference to accessing an unencrypted device. This is particularly the case where the cryptography engine has hardware cryptography modules to enable encryption and decryption at or above the read and write speed of the storage medium 105 and/or the data port 103. However, the user can disconnect the DSD 100 to lock it. This way, the DSD 100 can be carried by the user through insecure locations where the DSD 100 can be lost or stolen, but it is very difficult for another person to decrypt the encrypted user content data stored on storage medium 105. If the user maintains possession of the DSD, the user can connect it to a second host computer system 116, conveniently unlock the DSD 100 with his authorized device 111 (e.g., phone) and readily access the encrypted user content data stored on the storage medium 105.

For user convenience, the data port 103 can be configured such that if the DSD is locked, it registers with host computer system 104 as a mass data storage device with storage medium not present, similar to an SSD card reader with no card inserted. Once the authorized device 111 is connected to DSD 100 and the DSD 100 is unlocked, data port 103 switches to storage medium present, similar to a card reader that had an SSD card inserted. Such a configuration would avoid any warnings from being generated by the operating system of the host computer system 104 about the data not being accessible or access being denied. Instead, all user interaction would be performed by the app installed on the authorized device, which is fully controlled by the manufacturer of the DSD, so user experience can be optimized. As shown in FIG. 1, there may be further mobile phones acting as authorized devices 117 and 118.

Beacons and Key Fobs

Considering FIG. 1 again, it can be seen that there are further devices, such as beacons 120 and key fob 121. These devices can also be considered as "authorized devices" since they can operate essentially the same as the authorized device 111. Before initial registration by the manager device 110, these devices are referred to as "device to be authorized". When reference is made to a "user device" herein (mainly describing mobile phone 111 before initial registration), this also applies to the beacons 120 and key fob 121 except when noted otherwise, such as in cases where user input is required. Beacons 120 and key fob 121 also have their own private key stored securely so that they can respond to a challenge that is specific for one beacon or key fob. However, since the beacons 120 and key fob 121 have no user input, the initiation of communication may be slightly different. More particularly, beacon 120 and key fob 121 may periodically send advertisements to broadcast their existence and the DSD 100 then initiates the communication with beacon 120 and/or key fob 121, which prompts them to send their transport public key. This is in contrast to the authorized device 111, which sends the transport public key to the DSD 100 to initiate the communication.

In further examples, beacons 120 are in a de-activated state when they are powered up and need to be activated by a manager device 110 or an authorized device 111. This activation may follow a similar process as unlocking DSD 100. That is, manager device 110 or authorized device 111 or both are registered with each beacon 120 with their transport public keys and respond to a challenge as described herein. Thus, a device may be registered as a manager device or an authorized device with one of the beacons 102 and/or key fob 121 without being registered with the DSD 100 itself. If the response to the challenge is valid, beacons 120 then unlock DSD 100. In yet a further example, beacons 120 are registered with each other, such that manager device 110 and/or authorized device 111 need to activate only one of the beacons 120 and the remaining beacons become activated automatically. In other words, the activation 'spreads' through the beacon network as long as the beacons are in range of each other.

It is noted that the only piece of information that the authorized devices 111, 117, 118, 120 and 121 provide to the manager device 110 to become registered is one public key for each device. In other words, each device provides its own public key corresponding to a private key that is securely stored on that device. Therefore, if an attacker intercepts the initial communication between one of the devices 111, 117, 118, 120 and 121 and the manager device 110, the only information that the attacker can obtain is the public key. As the name suggests, the public key is not secret and can be generally known. Therefore, the attacker has not gained any advantage. Further, the manager device 110 cannot use the public key to gain access to anything else related to the authorized devices. For example, the manager device cannot decrypt or unlock any other data storage devices with which the authorized device has been registered by other manager devices.

The access controller 102 receives the public keys of the authorized devices from the manager device 110 and generates authorization data. Access controller 102 stores the authorization data on configuration memory 115 waiting for the authorized device to connect for the first time. On the first connection, access controller 102 performs a challenge-response for the authorized device and upon success, updates the authorization data to indicate that the authorized device is now fully registered. This first connection process is referred to as "re-enrolment" herein and details of generating the authorization data and the re-enrolment are provided below.

Elliptic Curve Cryptography

In one example, the challenge generated by the DSD 100 and sent to the authorized device 111 is based on elliptic curve cryptography. This has the advantages of shorter keys, which leads to more efficient communication and storage. Further, a large number of phones currently on the market provide dedicated functionality of elliptic curve cryptography within a secure hardware module. The secure hardware module securely stores the user's private keys and performs cryptographic primitives within the secure hardware module without the key leaving the secure hardware module and being sent to a general purpose processor core where the key may be subject to an attack for unauthorized retrieval. In one embodiment, the secure hardware module includes a separate processor that executes its own microkernel, which is not directly accessible by the operating system or any programs running on the phone. The secure hardware module can also include non-volatile storage, which is used to store 256-bit elliptic curve private keys. In one embodiment, the secure hardware module is a Secure Enclave coprocessor that is available on some Apple devices.

Authorized Device Data Record

Figure 2:
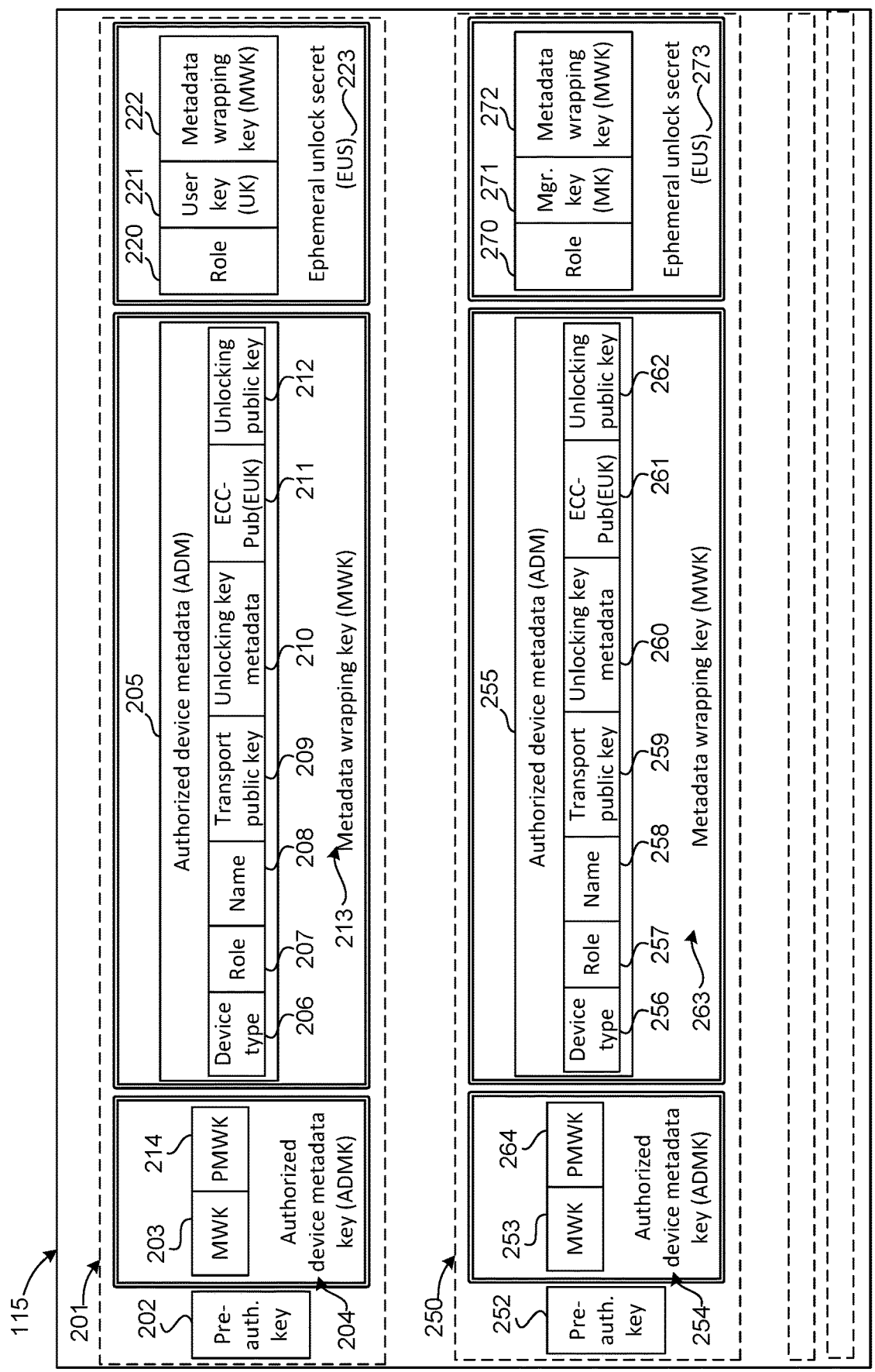
FIG. 2 illustrates a section of the configuration memory of the data storage device of FIG. 1, according to an embodiment.

FIG. 2 illustrates a section of configuration memory 115, according to an embodiment. More specifically, FIG. 2 illustrates one record 201, in configuration memory 115, which is associated with one of multiple authorized devices and referred to herein as "authorization data". Further data records for further authorized devices are schematically indicated as empty dashed boxes but not considered in detail as they operate in a similar manner to record 201. In particular, each further data record comprises authorization data generated by the access controller 102 in response to receiving a public key of a user device from the manager device 110 and then updated during the first connection of the user device (then "authorized device"). For convenience, the data structure of configuration memory 115 is referred to as a 'table' comprising one or more 'records', where each record relates to one registered authorized device and each record has multiple fields. It is noted, however, that other data structures can be used, such as JavaScript Object Notation (JSON), Extensible Markup Language (XML), binary formats, etc. In one example, each entry has a fixed length and the table has a fixed number of rows (i.e., entries). Within this disclosure, a 'record' may also be known as a 'row' or 'entry'.

Record 201 comprises a field for a pre-authorization key 202, which is used responsive to the authorized device 111 connecting to the DSD 100 for the first time. During this first connection, access controller 102 performs a number of steps that are referred to as "re-enrolment" as described below in more detail. The pre-authorization key 202 is generated from the identifier (e.g., the transport public key) of the authorized device 111. For example, access controller 102 may generate the pre-authorization key 202 by applying a key derivation function using the x-coordinate of the transport public key as an input parameter together with an authorized device slot key as salt value to the derivation function. The authorized device slot key may be a pseudo-random number (e.g., 16-bytes) stored on configuration memory 115 and can be used to encrypt data in authorized device certificates so that only the issuing DSD 100 can recover the information.

At that point, it can be said that the records stored on the configuration memory 115 are indexed by preauthorization key 202 based on an identifier of the authorized device (e.g., the transport public key). As described below with reference to FIG. 4, the index of record 201 may be stored in a certificate, as a slot number, during re-enrolment and at that point the pre-authorization key 202 can be replaced by a random value to make the configured DSD indistinguishable from a new device from the factory even with possession of the transport public key.

Record 201 further comprises a field for a first copy of a metadata wrapping key (MWK) 203 and a pre-authorization metadata wrapping key (PMWK) 214. Some fields in record 201 are encrypted which is indicated by double-lined boxes, where the single solid line boxes, inside the double-lined boxes, indicate the 'payload' such as the metadata wrapping key 203 and the pre-authorization metadata wrapping key 214. The corresponding encryption key, used to encrypt the payload, is noted at the bottom of the double-lined box. So, for example, metadata wrapping key 203 is encrypted by an authorized device metadata key (ADMK) 204. It should be noted that each encryption box may comprise an additional nonce that is concatenated with the payload data. This guarantees that the encrypted entry cannot be distinguished from random data even with the possession of the encrypted data, such as the transport public key of the authorized device.

Record 201 further comprises a field for authorized device metadata (ADM) 205, which is a concatenation of a device type 206 (e.g., recovery key, key fob, beacon, phone, computer, watch, etc.), a role of the device 207 (e.g., manager or user), a name of the device 208 (e.g., "John's phone"), a transport public key 209, unlocking key metadata 210 (e.g., key restrictions of whether fingerprint, pin or no unlock is required), an ephemeral public key 211, and an unlocking public key 212. In one embodiment, the ephemeral public key 211 is an elliptic curve public key generated from a random ephemeral private key (EPK) using an Elliptic Curve Cryptography (ECC) primitive ECC-Pub (EUK). The ephemeral private key is not stored on configuration memory 115 or on the authorized device 111 but is discarded after creating the ephemeral public key. This means that the ephemeral private key is not stored on non-volatile memory but only on volatile memory. As result, a power-down of the memory leads to complete and irrecoverable loss (e.g., destruction) of the ephemeral private key. The unlocking public key 212 corresponds to an unlocking private key stored on authorized device 111 and is generated by authorized device 111 and provided to the access controller 102.

The authorized device metadata (concatenated with a further nonce) is encrypted by the metadata wrapping key (MWK) 213 that is also stored in encrypted form at 203. The main purpose of storing the encrypted metadata wrapping key 203 in entry 201 is to allow a manager user, who has access to the authorized device metadata key 204, to access the encrypted authorized device metadata 205. If the metadata wrapping key was not accessible to the manager, the manager would not be able to retrieve from the DSD 100 any information about which authorized devices are currently registered. In one example, the authorized device metadata key 204 is a single key for all authorized devices and is stored encrypted by a manager key. The manager key may be a pseudo-random value (e.g., 32 bytes) and generated by access controller 102 responsive to storage medium 105 being erased. The manager key is encrypted and stored for each paired manager device 110/114.

Record 201 further comprises a field for a second copy of device's role 220 concatenated with a user key 221 and a second copy of the metadata wrapping key 222. It is noted that both role 207/220 and metadata wrapping key 203/222 are stored in two copies, which are identical but encrypted using different keys. The purpose of storing two copies of the role 207/220 is to enable the access controller 102 to verify the role during connection (responsive to the authorized device metadata being decrypted) as well as during unlocking (responsive to the user key 221 being decrypted). The purpose of storing the first copy of the metadata wrapping key 203 is to provide it to a manager device having access to the authorized device metadata key. The purpose of the second copy of the metadata wrapping key 222 is to provide it to a pre-authorized device during the first connection. The concatenated values 220, 221, 222 together are encrypted by an ephemeral unlock secret (EUS) 223 that is originally generated by a Diffie-Hellman method using the ephemeral private key corresponding to ephemeral public key 211 and the unlocking public key 212. The ephemeral unlock secret 223 can be recovered using the ephemeral public key 211 and an associated unlocking private key stored on the authorized device 111 and corresponding to unlocking public key 212. In other words, the ephemeral unlock secret 223 can be generated at the initial connection of the authorized device 111 to the DSD 100 using the ephemeral private key and the unlocking public key 212. It is noted that the ephemeral private key itself is not stored but nevertheless, the ephemeral unlock secret 223 can be recovered as described above. This means, the user key 221 is decryptable based on the response from the authorized device. It is noted that the user key 221 is identical for all authorized devices and can be used to decrypt user content data. This does not necessarily mean that the user key itself decrypts the user content data. There may be further keys that the user key decrypts and the final key decrypts the user content data. The terms "using a key to decrypt user content data" and "enable decryption of the user content data" refer to indirect encryption via multiple keys in a chain. In contrast "the key decrypts the data" refers to direct decryption of the data with the key, such as modulo multiplication of the encrypted data by the key. Here, the user key 221 is used to decrypt the data indirectly and may be the starting point of a chain of keys that are decrypted sequentially until finally, the chain ends at the key that decrypts the user content data. While in most examples disclosed herein, the ephemeral unlock secret 223 decrypts the user key 221, it is also possible that the cryptographic key is derived from the response to the challenge in other ways. For example, the response to the challenge may directly be used as the cryptographic key that decrypts the user content data.

This allocation of keys and metadata enables a configuration where the entire configuration information about authorized devices, manager devices, and other aspects is stored on the DSD 100 itself. However, the authorized devices require a key stored on the respective authorized device to unlock the DSD 100. If an unregistered user without access to any keys wants to access the entire configuration of the device, such as retrieve a list of registered devices, the unregistered user would need only the recovery key to become registered as a manager device and gain access to the manager key. The DSD 100 can then provide the entire contents of configuration memory 115 to the new manager device using the manager key. Further, there can be two manager devices and both can register or remove authorized devices. The other manager device would be able to obtain configuration updates by synchronizing its own records with the data stored on configuration memory 115. In some examples, the DSD 100 is configured to erase records 201 of all authorized devices (but not delete the user content data or the user key 221, which may be stored as another copy in encrypted form on configuration memory 115 separate from entry 201 and other entries) if the recovery key is used to gain access but that is a policy decision.

Figure 3:
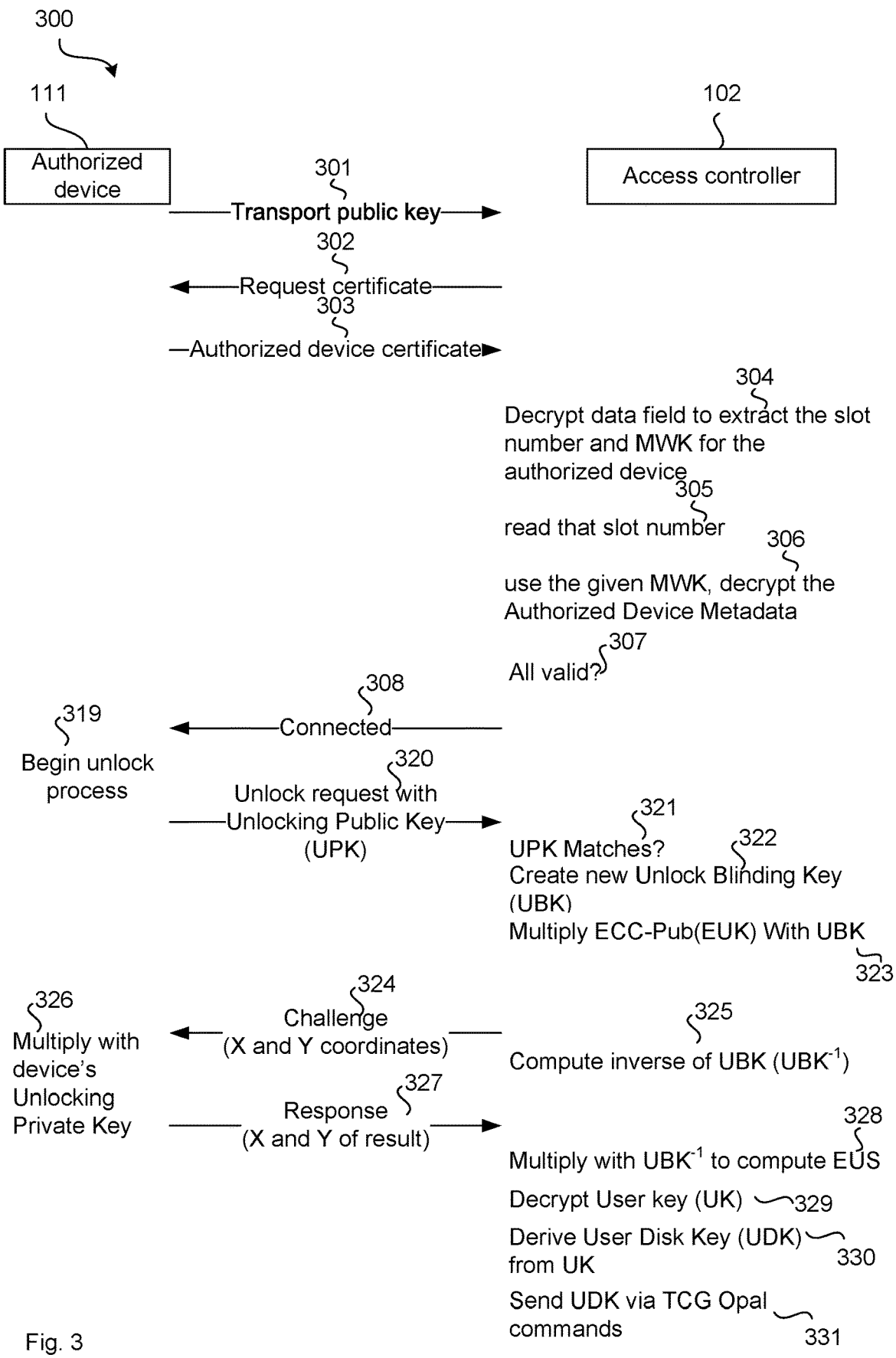
FIG. 3 illustrates a control flow between the authorized device and the access controller of FIG. 1, according to an embodiment.

FIG. 3 illustrates the control flow 300 between an authorized device 111 and an access controller 102, according to an embodiment. First, the authorized device 111 initiates a connect method by sending 301 its transport public key. This step can be easily re-played by an attacker. Access controller 102 then replies 302 with a request for a certificate and in response to this request, authorized device 111 sends 303 a certificate previously obtained from the access controller 102 through the re-enrolment process.

Certificate

Figure 4:
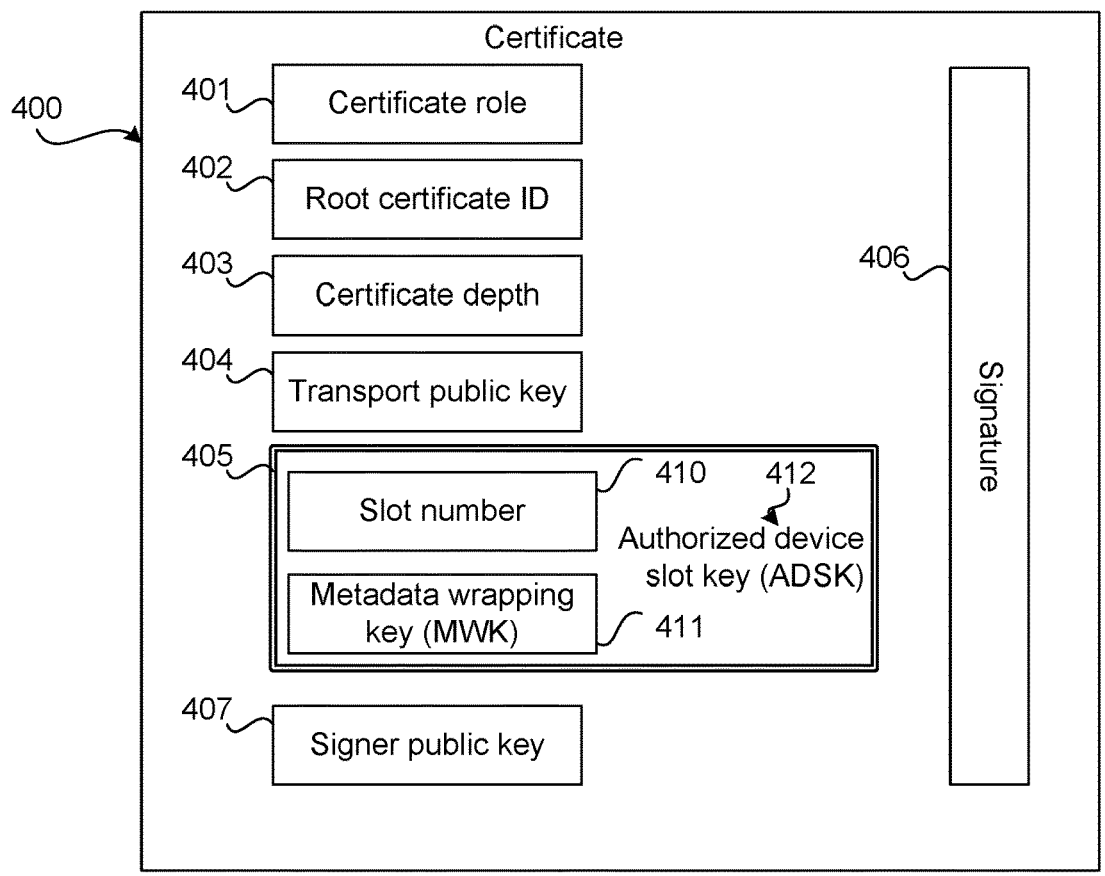
FIG. 4 illustrates a certificate issued by the data storage device and sent by the authorized device to the data storage device to unlock the data storage device, according to an embodiment.

FIG. 4 illustrates a certificate 400 issued by the data storage device 100 and sent by the authorized device 111 to the data storage device to unlock the data storage device, according to an embodiment. In this example, the certificate 400 comprises multiple type-length-value (TLV) fields, where the type value indicates the kind of field that is part of the certificate, length is the size of the value field (typically in bytes), and value is a variable-sized series of bytes which contains data for this part of the certificate.

Certificate 400 begins with a TLV atom that indicates the type of certificate that follows. This is referred to as the certificate role 401 and has a 2 byte value to indicate that this is an authorized device certificate.

Certificate 400 belongs to a certificate chain. Access controller 102 uses the chain to validate and authenticate certificate 400. To indicate which chain certificate 400 belongs to, certificate 400 has a 4 byte root certificate identifier (ID) 402. The certificate identifier of each certificate in the certificate chain is the same. Certificate identifiers that do not match indicate an invalid certificate. In one example, a root certificate identifier indicates whether the certificate chain is a production or a development certification chain. In other examples, other groups may be indicated by respective certificate identifiers.

Certificate 400 further comprises a 1 byte indicator of certificate depth 403. A certificate's depth is defined as its distance from the root certificate within its certificate chain. The root certificate is defined to have a depth of zero. As a given certificate chain is processed the depth fields are validated to ensure integrity of the chain.

Certificate 400 also comprises a 64 byte certificate transport public key 404 (e.g., according to the National Institute of Standards and Technology (NIST) P-256 elliptic curve). Each certificate is denoted/indexed via a transport public key. Each type of public key will have its own dedicated tag type. That is, the tag type will denote the cipher suite used to generate the transport public key, such as the P-256 cipher suite.

Certificate 400 further comprises a data field 405 (explained below) and is authenticated via a signature 406. Access controller 102 receives certificate 400 and validates the signature before trusting or using any of the certificate's contents. To enable signature validation, the 64 byte signer public key 407 is provided as part of the certificate. The signature 406 itself is 64 bytes in length and computed over all prior TLVs 401-405, 407 encountered within the certificate, regardless if they are recognized by the implementation or not. More particularly, the signature 406 is derived from a hash of the certificate data. The specific data that is signed is certificate dependent, but contains all TLVs used to represent the certificate, including TLVs that are not recognized. The key used to generate the signature is a logical identity key and is associated with signer public key 407.

Data field 405 comprises the slot number 410, which denotes the index of the record 201 within configuration memory 115. Data field 405 also comprises a further copy of the metadata wrapping key 411 (in addition to the two copies shown in FIG. 2). The data field 405 is encrypted with the authorized device slot key (ADSK) 412, which is a 16 byte pseudo random value stored in configuration memory 115 and is used to encrypt data in authorized device certificates so that only the issuing DSD 100 can recover the information.

Unlocking the Data Storage Device

Returning to FIG. 3, if the authorized device 111 wishes to unlock the DSD 100, the authorized device 111 sends 303 the certificate 400, which includes the encrypted metadata wrapping key (MWK) 213/411 to access controller 102. The certificate 400 also includes the slot number 410, which is an index of the record 201 in configuration memory 115.

Access controller 102 uses the authorized device slot key stored in configuration memory 115 to decrypt 304 data field 405, and extract the slot number and metadata wrapping key.

Access controller 102 then queries configuration memory 115 to read 305 the appropriate record 201 from configuration memory 115 and decrypts 306 the authorized device metadata 205 using the metadata wrapping key. This yields the ephemeral public key 211, which may also be referred to as an identifier of the authorized device because it uniquely identifies the authorized device since the ephemeral public key 211 is cryptographically associated with an unlocking private key stored only on authorized device 111. Access controller 102 may perform additional checks 307, such as validate that the transport public key 209 included in the authorized device metadata 205 matches the transport public key 404 presented in the certificate 400. Further, access controller 102 validates the role 401 against the valid set of values, and associates the role with the connection. This means that access controller 102 is aware of the current role (authorized device or manager device) during the duration of connection. For example, access controller 102 stores a parameter value on volatile memory that indicates the role 401 provided in the certificate. If any of the preceding checks fail, the authorized device is deemed to be revoked and an error to that effect is issued. Otherwise, the connection attempt succeeds and the access controller 102 sends 308 a connected confirmation message to the authorized device 111.

At this stage, the authorized device 111 is connected and the unlock process begins 319 by the authorized device 111 sending 320 an unlock request to access controller 102. The unlock request includes the unlocking public key associated with the private unlocking key stored on the authorized device's secure hardware module. Access controller 102 matches 321 the received unlocking public key against the unlocking public key 212 stored in the authorized device metadata record 205. Next, access controller 102 generates 322 a new blinding value (also referred to as unlock blinding key (UBK)), which essentially is an ephemeral private scalar and is generated randomly.

Access controller 102 then generates the challenge based on the identifier of the authorized device (e.g., ephemeral public key 211) multiplied by the unlock blinding key (UBK). More particularly, access controller 102 multiplies 323 the ephemeral public key 211 by the unlock blinding key, returning the full X and Y coordinates of the result, noting that this operation is performed on an elliptic curve. Access controller 102 then sends 324 the X and Y coordinates to the authorized device 111 as the challenge. It is noted here that this challenge is based on the identifier of the authorized device 111 because the ephemeral public key is one factor of the multiplication resulting in the challenge. It is further noted that for each unlock request (i.e., 320) a different unlock blinding key is generated to avoid man-in-the-middle attacks.

Further, access controller 102 computes 325 the inverse of the unlock blinding key (UBK$^{-1}$). The access controller 102 can compute the inverse of the unlock blinding key while waiting for a response from the authorized device 111.

The authorized device 111 calculates a response to the challenge by multiplying 326 the challenge with the unlocking private key, which is stored in the authorized device's secure hardware module and which corresponds to unlocking public key 212 stored on configuration memory 115. This may involve the execution of a cryptographic primitive that can be executed entirely within the secure hardware module within the authorized device 111. Authorized device 111 then sends back 327 the result in a response message. Access controller 102 multiplies 328 the returned result with the inverse of the unlock blinding key to compute the ephemeral unlock secret (EUS) 223.

In mathematical notation, P represents the ephemeral public key, and k represents the unlock blinding key created at step 322 in FIG. 3. Access controller 102 calculates 323 the product k*P and sends 324 it to the authorized device 111. The authorized device 111 multiplies 326 the challenge with the unlocking private key j to calculate j*k*P and returns 327 the result to access controller 102. The access controller 102 multiplies 238 this response with the inverse of the unlock blinding key k$^{-1}$ to calculate $$k^{-1}*j*k*P$$

which is equal to j*P due to commutative nature of elliptic curves (i.e., $k^{-1}*j*k*P=k*k^{-1}*j*P=j*P$).

Access controller 102 then uses j*P as the ephemeral unlock secret (i.e., key) to decrypt 329 user key 221. That is, access controller 102 uses the ephemeral unlock secret to decrypt the user key 221, stored on the DSD 100, which is encrypted with the ephemeral unlock secret. More particularly, access controller 102 decrypts 329 the user key, which then decrypts 330 a "user drive key", which is then, finally, sent 331 to cryptography engine 106 via TCG commands. That is, the user drive key may be generated by access controller 102 using a key derivation function based on the user key. The user drive key is the TCG credential used to unlock the DSD 100 and may be equated to the "cryptographic key" described herein. In the case of Opal, this is the User2 credential.

It is noted that the ephemeral unlock secret is generated during the re-enrolment process by deriving a symmetric key from the result of an Elliptic Curve Diffie-Hellman process using the unlocking private key stored on the authorized device 111 and the unlocking public key 212. The resulting key is used to encrypt the user key 221 but not stored in DSD 100. Instead, it is re-generated each time an authorized device requests to unlock the DSD 100, as described above.

In a further example, the unlocking private key j, in the equations above, can be replaced by a product of the unlocking private key with a value derived from a passphrase. The unlocking private key would still be stored in the secure hardware module of the authorized device but the unlocking private key alone would not be able to decrypt the user content data stored on the DSD 100. Instead, the user needs to enter the passphrase to calculate the response to the challenge and send 327 that response. This would simply replace j above with the product of j with the passphrase value. The DSD would be oblivious of that change because the ephemeral unlock secret 223 would be generated in the same way as above from the view of the access controller 102.

Registration and Re-Enrolment

It is noted that the data record 201 shown in FIG. 2 is shown after the authorized device 111 has completed the re-enrolment process and is allowed to decrypt the encrypted user content data. Again, there are three steps overall: First, the manager device 110 registers a user device 111 once as one of multiple authorized devices. Second, the authorized device 111, on first connection with the access controller 102, re-enrols once to complete the generation of the involved keys. Third, the authorized device 111 subsequently connects with the access controller 102 to unlock the DSD 100. This third step can occur multiple times.

During the (initial) registration step initiated by the manager device 110, access controller 102 receives from the manager device 110 a public key corresponding to a private key stored on the user device 111. In response, access controller 102 creates authorization data, which is similar to the data record 201 in FIG. 2 with the exception that the unlocking public key 212 field holds the transport public key 209 (as received from the manager device 110) because the unlocking public key has not yet been generated. Access controller 102 generates the pre-authorization key 202 that is essentially an index to locate the record 201. The pre-authorization key is generated by a key generation function using the x coordinate of the received transport public key 209 and a salt value. The salt value may be an authorized device slot key, which may be a 16-bytes pseudo-random value generated during the "take ownership" process, stored on the configuration memory 115, and not shared with the authorized device. This way the salt can be different after each "factory reset", such as each time a manager device takes ownership of the DSD 100.

Creating the authorization data stored in record 201 further comprises generating the metadata wrapping key 222, such as by generating a 16-bytes pseudo-random value. Access controller 102 stores the metadata wrapping key in field 222. Further, access controller 102 generates the ephemeral unlock secret 223 and encrypts the role 220 (e.g., "authorized device"), user key 221 and the new metadata wrapping key 222 with the ephemeral unlock secret 223. Then access controller 102 generates an ephemeral public key 211 from the ephemeral unlock secret 223 and discards ephemeral unlock secret 223.

Recall that during the (initial) registration step initiated by the manager device 110, access controller 102 creates authorization data, which is similar to the data record 201 in FIG. 2. In contrast to FIG. 2, the authorized device metadata 205 is not encrypted by the new metadata wrapping key but by a pre-authorized metadata wrapping key because the actual metadata wrapping key 222 is not yet available to the authorized device 111. The pre-authorized metadata wrapping key may be identical to the pre-authorization key 202 at this stage or generated separately. It is noted that the pre-authorized metadata wrapping key, which now encrypts the authorized device metadata 205 can be generated only by the access controller 102 and not provided by the authorized device 111 because the authorized device 111 does not have access to the authorized device slot key that is used to generate the pre-authorized metadata wrapping key.

So, responsive to the authorized device 111 first connecting with the access controller 102, authorized device 111 sends its transport public key to access controller 102. Access controller 102 uses the transport public key and the stored authorized device slot key to generate the pre-authorization key 202. Access controller 102 can then search for the pre-authorization key 202 in the configuration memory 115 to retrieve record 201. Access controller 102 can also use the pre-authorization key as the pre-authorization metadata wrapping key to decrypt the authorized device metadata 205.

As described above, access controller 102 generates a challenge using the ephemeral public key 211 and an unlock blinding key. Access controller 102 then creates the ephemeral unlock secret 223 from the response. It is noted that only the authorized device 111 with the private key corresponding to transport public key 209 can create a valid response. This means that even if an attacker disassembles the configuration memory 115 and reads the authorized device slot key to generate the pre-authorization metadata wrapping key to decrypt the ephemeral public key 211, the attacker would still not be able to generate the ephemeral unlock secret 223.

Access controller 102 validates the response by checking that the response works as ephemeral unlock secret 223 and in response, updates the authorization data in record 201. More particularly, access controller 102 checks whether field 212 for the unlocking public key is identical to the transport public key 209. In response to both being identical (as set out above), access controller 102 requests a new unlocking public key from authorized device 111 and stores the returned key as unlocking public key 212.

Access controller further decrypts the metadata wrapping key 222 that was generated during registration by the manager device 110. At this stage, access controller 102 may re-generate the ephemeral unlock secret 223, encrypt role 220, user key 221, and metadata wrapping key 222, re-generate and store the ephemeral public key 211 and discard the ephemeral unlock secret 223. Finally, access controller encrypts the authorized device metadata 205 with the metadata wrapping key 222 and overwrites the pre-authorization key 202 with random values to make the configuration memory 115 indistinguishable from random data even with the possession of the transport public key and/or the unlocking public key. This concludes the update of the authorization data stored in record 201 and the registration process. As a result, the authorized device 111, as one of multiple authorized devices, is now allowed to decrypt the encrypted user content data through the unlocking steps set out above.

The process described above, involving the creating and update of authorization data, enables the registration of multiple authorized devices using only their public keys during the first step of registration by the manager device 110. This way, no secret information needs to be shared that could potentially be intercepted and used for malicious unlocking of other devices of the user.

Multiple Roles

Returning to FIG. 2, configuration memory 115 stores multiple entries of which only two are shown (first entry 201 and second entry 250). In most cases, there is one entry per registered device. Each 'registered' device may be a manager device 110 or authorized device 111, 117, 118, 120, 121. There may be additional entries, such as for a recovery key (not shown).

First entry 201 is associated with authorized device 111, as explained in detail above. It is noted again, that the first entry stores a user key 221 that is encrypted by ephemeral unlock secret 223, which can be calculated from a response to a challenge using the ephemeral public key ECC-Pub (EUK) 211.

Second entry 250 is associated with manager device 110. Most fields in second entry 250 have the same functionality as in first entry 201 and as described above. In summary, a pre-authorization key 252 enables locating second entry 250 at the first connection of manager device 110 with DSD 100, noting that manager device 110 may have been registered by another manager device that initially performed the take ownership process. This registration proceeds the same way as the registration of an authorized device explained above (including the re-enrolment and the use of certificates to provide the entry index and metadata wrapping key). Again, a copy of the metadata wrapping key 253 and the pre-authorized metadata wrapping key 264 are stored encrypted by the authorized device metadata key to enable manager access to authorized device metadata 255, which is encrypted by the metadata wrapping key 263. The metadata wrapping key 263 is provided in a certificate by the manager device 110 to decrypt the authorized device metadata 255, which comprises a device type 256 and role 257. The role 257 is now different to the role 207 as role 257 holds a value indicating a manager role, whereas role 207 holds a value indicating a user role. It is noted that the metadata wrapping key 203/213/222 of first entry 201 is different from metadata wrapping key 253/263/272 of second entry 250.

Again, similar to the first entry 201, authorized device metadata 255 comprises a name 258, transport public key 259, unlocking key metadata 260, ephemeral public key 261 and unlocking public key 262 of the manager device 110. These functions are similar to their counterparts in first entry 201 and as described above. Manager device 110 also stores a transport private key and unlocking private key on a secure hardware module. Further, access controller 102 generates a challenge based on the ephemeral public key 261 and calculates, based on the response from the manager device 110, the ephemeral unlock secret 273, which decrypts a second copy of the role 270 and a second copy of the metadata wrapping key 272. In contrast to the first entry 201, where the user key 221 is decrypted, the ephemeral unlock secret 273 now decrypts the manager key 271, which provides manager access.

In some examples, the user key 221 is directly derivable from the manager key 271, which means that the manager key is the only secret information that is required to calculate the user key. The derivation may be one-way, which means the manager key cannot be derived from the user key. The derivation may be based on a hash function, such as a hash-based message authentication code (HMAC) according to the request for comments (RFC) 5869 of the Internet Engineering Task Force (IETF) using Secure Hash Algorithm 2 (SHA-2) with 512 bits (see also National Institute of Standards and Technology special publication (SP) 800-56C). It is noted that the manager key is identical for all manager device entries and consequently, the user key is also identical for all authorized device entries.

Having a derivable user key also means that as soon as the manager key 271 is available, the user key can always be calculated. As a result, in response to manager device 110 providing the correct response to the challenge, access controller 102 can decrypt the user content data using the user key derived from the manager key 271 which was decrypted based on the response. Therefore, manager device is said to be provided with manager access, which comprises access to the user content data and access to the authorization data stored on configuration memory 115. As a result, manager device 110 can request a list of registered devices, which can be provided by the access controller 102. Consequently, manager device 110 can store the list locally on manager device 110 and display the list on a graphical user interface. The process of retrieving all entries of registered devices may be supported by a bitmap data object that comprises one bit for each possible data entry, such as 256 bits for 256 possible registered devices. Access controller 102 sets the bit to '1' in response to writing one of the multiple entries. This way, access controller 102 can determine which entries are valid and does not attempt to decrypt invalid entries.

In contrast to manager device 110, authorized device 111 has no access to manager key 271 but only access to user key 221, which does not enable decryption of other devices' metadata. Therefore, it is said that the reading of authorization data associated with other registered devices is restricted for authorized devices (without access to the manager key 271).

It is noted here that each entry 201/250 and each further entry that is not shown, comprises metadata that is encrypted by a different metadata wrapping key. Therefore, in response to providing manager access, access controller 102 determines a separate metadata wrapping key for each entry. More particularly, with the manager key 271 available, access controller 102 calculates the authorized device metadata key 254 (which is identical for all entries) and uses that key for decrypting each entry-specific metadata wrapping key 203/253, which in turn, enables access controller 102 to decrypt each authorized device metadata 255. It is also noted that manager access does not allow decryption of the user key 221 from the authorized device entries because calculating the ephemeral unlock secret 223 requires the unlock secret key that is kept in the memory of each authorized device. However, the user key 221 is derivable from the manager key 271, so there is no benefit for the manager device 110 to decrypt the user key 221 from the authorized device entry 201.

In summary, the entries 201 and 250 store either the user key 221 or the manager key 271 which enables the access controller to selectively provide user access or manager access to the multiple registered devices.

Initialization

As set out above, DSD 100 is shipped from the factory without any user devices 111 having been previously registered with the DSD 100. Further, a factory reset may set the DSD 100 into the same state. This state, with no registered devices and no user content data, is referred to as "nascent state". This may mean that user content data is still stored on the storage medium 105, but the keys have been destroyed, so the user content data is indistinguishable from random data. In this nascent state, manager device 110 (that is not yet registered as such) can perform a "take ownership" method as mentioned above to register itself with the DSD 100 as a manager device. It may also be possible to perform "take ownership" in any state of the DSD 100, but that results in a complete loss of user content data and information regarding registered devices, since the storage medium 105 and configuration memory 115 are crypto-erased (e.g., keys are deleted or overwritten).

Since access controller 102 and manager device 110 (that is not yet registered as such) have not yet shared any information before the take ownership process, they first establish a secure communication channel. To that end, access controller 102 and manager device 110 execute a security protocol that is based on an out-of-band communication of an identity key from the access controller 102 to the manager device 110 by way of the QR code or NFC chip 112. The identity key can then be used to secure a communication channel and can then be authenticated by the access controller 102 using a certificate linked to a root certificate accessible by the manager device 110. As a result, the manager device 110 and the access controller 102 do not need to share any private information until the access controller 102 is authenticated to the manager device 110.

Before the connection is established, the access controller 102 generates a random value and calculates a message authentication code (MAC) using the identity key and the random value. The access controller 102 broadcasts the random value with the MAC as part of a periodic broadcast packet over a wireless communication channel (e.g., Bluetooth broadcast). The manager device 110 scans the QR code 112 to obtain the identity key (or reads the identity key from an NFC chip). This enables the manager device to listen to broadcast packets from the DSD 100. More particularly, manager device 110 receives the broadcast packets including the random value and re-computes the MAC based on the random value and the identity key obtained out-ofband. Manager device 110 then matches the MAC from the broadcast packet against the re-calculated MAC and discards all packets where the MACs do not match. For packets where the MACs do match, access controller 102 can assume that these packets in fact originate from the DSD 100 from which the identity key was obtained.

This initial authentication is possible without the access controller 102 or the manager device 110 having to provide any private information to each other over the wireless communication channel. This improves privacy of the "pairing" process. Since the MAC is calculated using the identity key, only devices that are in proximity and that can scan the QR code (or read the NFC chip) can re-calculate the MAC. So, having the identity key is a proof of possession of the data storage device 100. Therefore, only user devices 111 that have the identity key can identify which broadcast packets originate from DSD 100. To all other devices, the advertising packets appear random. In case of multiple access controllers 102 from multiple DSDs 100 sending advertising packets and multiple identity keys being available, the manager device 110 can try each available identity key and attempt re-calculation of the MAC. If the result matches, the manager device 110 has established that the matching identity key is for the device with the matching MAC.

Manager device 110 can now send a connection request. Manager device 110 may use the random value or MAC or both as a communication address and may encrypt the data in the connection request using the identity key. Access controller 102 has access to a data storage device certificate (different to certificate 400 in FIG. 4) stored on configuration memory 115. The data storage device certificate is cryptographically linked to a root certificate (not shown) that is accessible by the manager device 110. For example, the root certificate may be stored on a web server or cloud storage or may be supplied together with the program code of the app. The access controller 102 calculates a signature verified by the data storage device certificate and sends the data storage device certificate and the signature to the manager device 110. The manager device 110 accesses the root certificate through the application installed on the manager device 110 from an authenticated provider cryptographically associated with the root certificate, such as an app store that holds a certificate for the manufacturer of the DSD 100. This way, manager device 110 can verify that the identity key has been issued by the manufacturer of the data storage device and not by a man in the middle.

In response to verifying the certificate received from the access controller 102, manager device 110 sends a transport public key 259 to the access controller 102 as for unlocking the DSD 100. However, the manager device 110 is not yet registered, so the access controller 102 checks the records of authorized devices for a matching pre-authorization key 202/252. In response to determining that there is no matching record, access controller 102 sends a corresponding message to manager device 110. The application installed on manager device 110 then presents two options on a graphical user interface:

request access from a remote approver while preserving the user content data and cryptographic keys that encrypt the user content data; or take ownership while crypto-erasing the user content data by re-generating the cryptographic keys that encrypt the user content data.

In response to the user selecting the second option for taking ownership, manager device 110 sends a request to take ownership to the access controller 102. In response, access controller 102 formats the storage medium 105, such as by re-writing an empty file-structure onto the storage medium 105. Further, access controller 102 generates a new record 250 in configuration memory 115, generates a new user drive key (not shown), and a new manager key 271.

Access controller 102 then generates a new ephemeral private key (as a random value), derives the ephemeral unlock secret 273 and ephemeral public key 261 from the ephemeral private key, generates a new metadata wrapping key 272, and encrypts the role 270, manager key 271, and metadata wrapping key 272 with the ephemeral unlock secret 273. Then, access controller 102 discards the ephemeral private key.

For the metadata 255, access controller 102 requests a new unlocking public key 262 and a name 258 from the manager device 110. Access controller 102 also sets the device type 256 to "user device" (rather than "beacon", "key fob" or "recovery key") and sets the role 257 to "manager". Finally, access controller 102 encrypts the resulting metadata including device type 256, role 257, name 258, transport public key 259 (the first sent public key), unlocking key metadata 260, ephemeral public key 261, and unlocking public key 262 (the second sent public key) with the newly-generated metadata wrapping key 263. Further, access controller 102 encrypts another copy of the metadata wrapping key 253 and the pre-authorization metadata wrapping key 264 using the authorized device metadata key 254 derived from the manager key 271. Finally, access controller 102 stores the resulting data on configuration memory 115 as shown in FIG. 2, noting that authorized device record 201 is now invalid because the user key 221 has been changed, so the associated authorized device 201 cannot decrypt the user content data anymore. Access controller 102 may use a bit map with one bit per record to indicate that record 201 is now invalid. Access controller 102 may overwrite record 201 with random data. Access controller 102 further issues certificate 400 to manager device 110.

Once manager device 110 is registered with access to the manager key 271, manager device 110 can request access controller 102 to register further user devices with the role of either "manager" or "user", such as by storing further encrypted versions of the manager key 271 or the user key 221 as shown in FIG. 2. In one example, access controller 102 requires manager device 110 to unlock DSD 100 after registration before providing manager access. This means that manager device 110 and access controller 102 perform the steps described with reference to FIG. 3. That is, manager device provides the certificate 400, access controller 102 retries the slot number 410 and metadata wrapping key 411, and decrypts authorized device metadata 255. Access controller 102 then generates the challenge based on the ephemeral public key 261, calculates the ephemeral unlock secret based on the response, and finally decrypts the manager key 271 and derives the user key 221.

Method for Initializing a Data Storage Device

Figure 5:
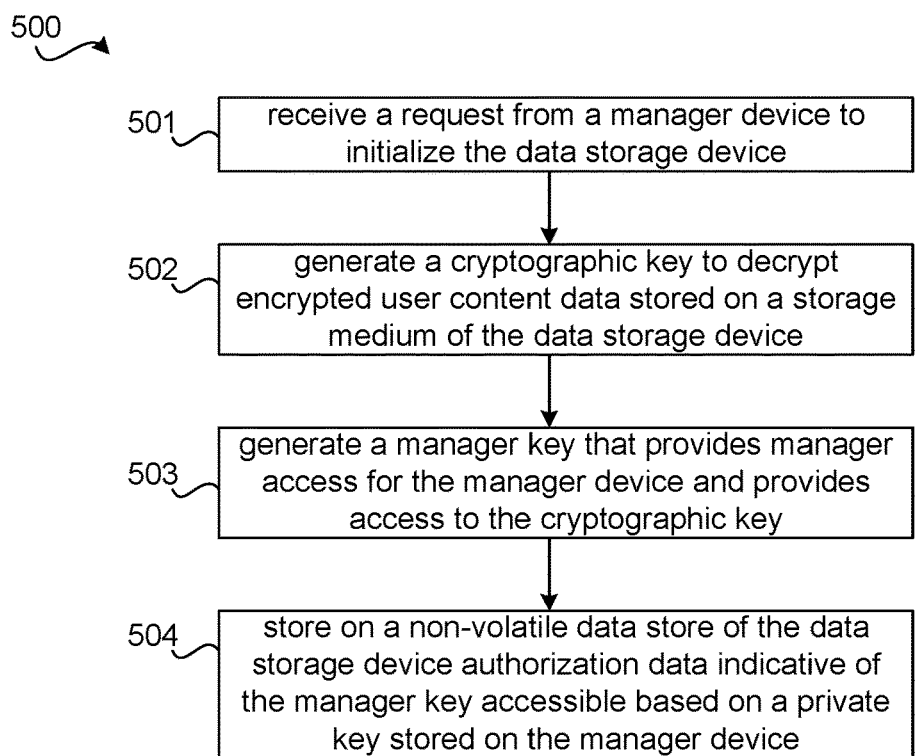
FIG. 5 illustrates a method for initializing a data storage device, according to an embodiment.

FIG. 5 illustrates a method 500 for initializing data storage device 100, according to an embodiment. First, access controller 102 receives 501 a request from a manager device 110 (that is not yet registered as such) to initialize the data storage device as described above. This may occur when the data storage device 100 is in a "brand new" or "nascent" state from the factory or when the DSD 100 is to be re-purposed with complete loss of data. In response to receiving the request, access controller 102 generates 502 a new cryptographic key ("user drive key" above) to decrypt the encrypted user content data stored on storage medium 105 of the data storage device 110. Access controller 102 also generates 503 a manager key 271 that provides manager access for the manager device 110, such as by enabling the registration of authorized devices 111 and enabling the reading of existing authorized device records 201 and log data. The manager key also provides access to the cryptographic key, since a user key 221 is directly derivable from the manager key 271, and the user key 221 decrypts the user drive key (i.e., the "cryptographic key"). Finally, access controller 102 stores 504 on a non-volatile data store (configuration memory 115) of the data storage device 100 authorization data 250 indicative of the manager key 271 and accessible based on a private key stored on the manager device.

Registering the Data Storage Device

The data port 103 registers, with the host computer system 104, as a block data storage device. For example, Universal Serial Bus (USB) devices provide information in the form of a USB device descriptor. The USB device descriptor contains relevant information about the device. Accordingly, in embodiments in which the data storage device is connected to a host computer system via a USB connection, the data storage device registers with the host computer system as a block data storage device by configuring its USB device descriptor to indicate that the data storage device is a block data storage device.

The USB device descriptor provides structured information regarding the USB device such as the class of device, protocols supported, type of device, manufacturer and other configuration parameters. An operating system of a host computer can obtain the USB device descriptor of the data storage device by sending various standard control requests (e.g., GET_DESCRIPTOR requests) to the data storage device. In response to receiving these requests, the data storage device provides the USB_DEVICE_DESCRIPTOR to the host computer system, thus registering the data storage device with the host computer system as a block data storage device. The host computer interprets the USB_DEVICE_DESCRIPTOR to determine the configuration and capabilities of the data storage device. The host computer system may then store information regarding the data storage device in the registers of the operating system of the host computer system.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a data path comprising:
a data port configured to transmit data between a host computer system and the data storage device;
a non-volatile storage medium configured to store encrypted user content data; and
a cryptography engine connected between the data port and the non-volatile storage medium, wherein the cryptography engine is configured to use a cryptographic key to decrypt the encrypted user content data stored on the non-volatile storage medium in response to a request from the host computer system; and
an access controller configured to:
during an initialization process for the data storage device:
receive a request from a manager device to initialize the data storage device;
generate, responsive to the request from the manager device, the cryptographic key;
generate, responsive to the request from the manager device, a manager key configured to provide manager access to authorization data for registered devices; and
store, in a non-volatile data store, the authorization data, wherein:
the authorization data comprises an authorized device record for the manager device;
the authorized device record for the manager device is indicative of the manager key; and
the authorization data is accessible based on a private key stored on the manager device;
during a registration process for a user device:
approve, by the manager device, the user device to become a registered user device;
store, in the authorization data, an authorized device record for the registered user device, wherein:
the authorized device record comprises:
an encrypted user key configured to unlock, responsive to an unlock request from the registered user device, the cryptographic key; and
encrypted authorized device metadata configured to identify the registered user device; and
the manager device is configured to access the encrypted authorized device metadata responsive to the manager key; and
during an unlock process for the registered user device:
receive, from the registered user device, the unlock request;
validate, using the authorized device record for the registered user device, the registered user device;
determine, responsive to the unlock request and based on the authorized device record for the registered user device, the cryptographic key; and
provide, responsive to the unlock request, the cryptographic key to the cryptography engine to decrypt the encrypted user content data for access by the host computer system, wherein:
the host computer system is a first device;
the manager device is a second device; and
the registered user device is a third device.

2. The data storage device of claim 1, wherein the access controller is further configured to:
derive a user key from the manager key; and
encrypt the cryptographic key using the user key.

3. The data storage device of claim 1, wherein:
the access controller is further configured to encrypt the manager key; and
the authorization data comprises the encrypted manager key.

4. The data storage device of claim 3, wherein the encrypted manager key is decryptable based on an unlocking private key stored on the manager device.

5. The data storage device of claim 4, wherein:
the encrypted manager key is decryptable based on a response from the manager device to a challenge generated by the access controller; and
the response was calculated by the manager device based on the unlocking private key stored on the manager device.

6. The data storage device of claim 5, wherein the challenge is based on the authorization data.

7. The data storage device of claim 1, wherein the access controller is further configured to:
generate an ephemeral private key;

calculate an ephemeral unlock secret based on the ephemeral private key; and
encrypt the manager key using the ephemeral unlock secret.

8. The data storage device of claim 7, wherein the ephemeral unlock secret is based on an unlocking public key corresponding to an unlocking private key stored on the manager device.

9. The data storage device of claim 8, wherein the ephemeral unlock secret and the unlocking private key are based on elliptic curve cryptography.

10. The data storage device of claim 8, wherein the access controller is further configured to:
calculate an ephemeral public key corresponding to the ephemeral private key; and
encrypt the ephemeral public key using a metadata wrapping key.

11. The data storage device of claim 10, wherein the access controller is further configured to generate the metadata wrapping key.

12. The data storage device of claim 11, wherein the access controller is further configured to provide the metadata wrapping key to the manager device.

13. The data storage device of claim 12, wherein the access controller is further configured to:
create a certificate for the manager device, wherein the certificate includes the metadata wrapping key;
sign the certificate; and
send the signed certificate to the manager device.

14. The data storage device of claim 13, wherein the certificate comprises a transport public key sent to the access controller and corresponding to a transport private key stored on the manager device.

15. The data storage device of claim 1, wherein receiving the request from the manager device to initialize the data storage device comprises establishing a secure communication channel.

16. The data storage device of claim 15, wherein establishing the secure communication channel is based on an identity key provided on the data storage device and readable by the manager device out-of-band.

17. The data storage device of claim 15, wherein establishing the secure communication channel comprises:
generating a certificate;
signing the certificate; and
sending the signed certificate to the manager device.

18. The data storage device of claim 1, wherein the access controller is further configured to remove access for devices other than the manager device.

19. A method for initializing a data storage device configured for access from a host computer system, the method comprising:
during an initialization process for the data storage device:
receiving a request from a manager device to initialize the data storage device;
generating, responsive to the request from the manager device, a cryptographic key configured to decrypt encrypted user content data stored on a storage medium of the data storage device;
generating, responsive to the request from the manager device, a manager key configured to provide manager access to authorization data for registered devices; and
storing, in a non-volatile data store of the data storage device, the authorization data, wherein:
the authorization data comprises an authorized device record for the manager device;
the authorized device record for the manager device is indicative of the manager key; and
the authorization data is accessible based on a private key stored on the manager device;
during a registration process for a user device:
approving, by the manager device, the user device to become a registered user device;
storing, in the authorization data, an authorized device record for the registered user device, wherein:
the authorized device record comprises:
an encrypted user key configured to unlock, responsive to an unlock request from the registered user device, the cryptographic key; and
encrypted authorized device metadata configured to identify the registered user device; and
the manager device is configured to access the encrypted authorized device metadata responsive to the manager key; and
during an unlock process for the registered user device:
receiving, from the registered user device, the unlock request;
validating, using the authorized device record for the registered user device, the registered user device;
determining, responsive to the unlock request and based on the authorized device record for the registered user device, the cryptographic key; and
providing, responsive to the unlock request, the cryptographic key to a cryptography engine to decrypt the encrypted user content data for access by the host computer system, wherein:
the host computer system is a first device;
the manager device is a second device; and
the registered user device is a third device.

20. A data storage device comprising:
means for receiving, during an initialization process for the data storage device, a request from a manager device to initialize the data storage device, wherein the data storage device is configured for access from a host computer system;
means for generating, responsive to the request from the manager device, a cryptographic key configured to decrypt encrypted user content data stored on a storage medium of the data storage device;
means for generating, responsive to the request from the manager device, a manager key configured to provide manager access to authorization data for registered devices;
means for storing, during the initialization process and in a non-volatile data store of the data storage device, the authorization data, wherein:
the authorization data comprises an authorized device record for the manager device;
the authorized device record for the manager device is indicative of the manager key; and
the authorization data is accessible based on a private key stored on the manager device;
means for approving, during a registration process for a user device and by the manager device, the user device to become a registered user device;
means for storing, during the registration process and in the authorization data, an authorized device record for the registered user device, wherein:
the authorized device record comprises:

an encrypted user key configured to unlock, responsive to an unlock request from the registered user device, the cryptographic key; and
encrypted authorized device metadata configured to identify the registered user device; and
the manager device is configured to access the encrypted authorized device metadata responsive to the manager key;
means for receiving, from the registered user device during an unlock process, the unlock request;
means for validating, during the unlock process and using the authorized device record for the registered user device, the registered user device;
means for determining, responsive to the unlock request and based on the authorized device record for the registered user device, the cryptographic key; and
means for providing, responsive to the unlock request, the cryptographic key to a cryptography engine to decrypt the encrypted user content data for access by the host computer system, wherein:
the host computer system is a first device;
the manager device is a second device; and
the registered user device is a third device.

* * * * *